(12) United States Patent
Takayama

(10) Patent No.: US 6,284,828 B1
(45) Date of Patent: *Sep. 4, 2001

(54) POLYACETAL RESIN COMPOSITION

(75) Inventor: Katsunori Takayama, Fuji (JP)

(73) Assignee: Polyplastics Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/284,348

(22) PCT Filed: Oct. 21, 1997

(86) PCT No.: PCT/JP97/03794

§ 371 Date: Apr. 14, 1999

§ 102(e) Date: Apr. 14, 1999

(87) PCT Pub. No.: WO98/18861

PCT Pub. Date: May 7, 1998

(30) Foreign Application Priority Data

Oct. 25, 1996 (JP) .................................... 8-284057

(51) Int. Cl.$^7$ ........................................ C08K 3/10
(52) U.S. Cl. .................... 524/413; 524/424; 524/427; 524/432
(58) Field of Search ................... 524/504, 413, 524/424, 427, 432

(56) References Cited

U.S. PATENT DOCUMENTS

| 5,376,454 | * | 12/1994 | Sugasawa | 428/421 |
| 5,585,430 | * | 12/1996 | Patel | 524/406 |
| 5,854,324 | * | 12/1998 | Tajima | 524/232 |

FOREIGN PATENT DOCUMENTS

| 2-11624 | 3/1990 | (JP) . |
| 3-70764 | 3/1991 | (JP) . |
| 6-240105 | 8/1994 | (JP) . |
| 6-240106 | 8/1994 | (JP) . |
| 7-109401 | 4/1995 | (JP) . |
| 8-12848 | 1/1996 | (JP) . |
| 8-267491 | 10/1996 | (JP) . |
| 96/34054 | 10/1996 | (WO) . |

* cited by examiner

Primary Examiner—Paul R. Michl
(74) Attorney, Agent, or Firm—Nixon & Vanderhye P.C.

(57) ABSTRACT

To provide a polyacetal resin composition excellent in friction and abrasion resistance properties by improving the compatibility, dispersibility and interfacial adhesion between the polyacetal resin and an olefinic polymer. The polyacetal resin composition comprises: (A) 100 parts by weight of a polyacetal resin; (B) 0.5 to 100 parts by weight of a specified, modified olefinic polymer; (C) 0.01 to 10 parts by weight of an alkylene glycol polymer containing a primary or secondary amino group(s) and having a number-average molecular weight of 400 to 500,000; and (D) 0.1 to 20 parts by weight of an inorganic filler.

16 Claims, No Drawings

POLYACETAL RESIN COMPOSITION

DESCRIPTION

BACKGROUND OF THE INVENTION

1. Field of Industrial Application

The present invention relates to a polyacetal resin composition excellent in friction and abrasion resistance properties by improving the compatibility, dispersibility and interfacial adhesion between resins, which is obtained by blending a polyacetal resin with a specific olefinic polymer, an alkylene oxide polymer having a primary or secondary amine group(s), an inorganic filler together with, further, a lubricant if required, and melting and kneading.

2. Prior Arts

Since polyacetal resins have a well-balanced mechanical properties and are excellent in, for example, friction resistance and abrasion resistance properties, chemical resistance, heat resistance and electric characteristics, they have been widely used in some fields such as automobiles and electrical and electronic appliances. However, the performances required in such fields are gradually escalating. As one example, there has been desired to further improve the sliding performances as well as general physical properties. Such sliding performances include the friction and abrasion resistance properties against inorganic filler-blended materials.

For example, high requirements for decreasing costs and weights increases such cases that inorganic filler-blended materials, which is obtained by blending inorganic fillers such as glass fibers, glass flakes, talc and mica with a resin such as ABS, PC/ABS and PBT/ABS, are used for chassis of CD-ROM or the like. Generally, gear parts and lever parts are slid against the metal boss caulked or formed in a sheet metal chassis so that the friction and abrasion resistance properties against metal materials have been important. However, since the boss and others are molded together with the chassis into one piece using such resin materials, the sliding performances against the resin-made boss or resin-made guide has become more important.

The sliding against materials for the resin-made chassis needs much better friction and abrasion resistance properties than those necessary for the conventional sliding against metal materials because of insufficient friction and abrasion resistance properties inherent to ABS resin, as a partner material, and the effects of surface roughness caused by blended inorganic fillers. Thus, the improvement of such properties has been required.

In general, addition of a fluororesin or a polyolefinic resin, or addition of a lubricant such as fatty acids, fatty acid esters, silicone oils or various mineral oils, to polyacetal resins is effected for the purpose of the improvement of the sliding performances.

The addition of a fluororesin or a polyolefinic resin improves the sliding performances to a certain extent. However, since these resins other than the polyacetal resins exhibit poor compatibility with the polyacetal resins, the resultant resin compositions have unsatisfactory sliding performances under a high surface pressure, and they have poor abrasion resistance properties in the sliding against inorganic filler-blended materials. Further, there are problems in that they are liable to cause peeling on the surfaces of molded articles or to form a deposition on a mold.

While, the addition of a lubricant has various disadvantages such as the trouble of the processing in extrusion or molding, or the bleeding during using. Moreover, when used together with the above-mentioned resins other than the polyacetal resins, the lubricant inhibits the compatibility between these resins and the polyacetal resins and greatly deteriorates the abrasion resistance properties. For such problems, materials with these properties improved have been desired.

DISCLOSURE OF THE INVENTION

The present inventor has extensively investigated to attain the above object, and as a result, he has found that a resin composition having excellent sliding performances can be obtained by blending a polyacetal resin with a specific polyolefinic polymer, an alkylene glycol polymer and an inorganic filler optionally together with, further, a particular lubricant, and melting and kneading them, thus completed the present invention.

That is, the present invention provides a polyacetal resin composition prepared by blending (A) 100 parts by weight of a polyacetal resin, (B) 0.5 to 100 parts by weight of a modified olefinic polymer obtained by modifying an olefinic polymer (B-1) with at least one selected from the group consisting of an unsaturated carboxylic acid and acid anhydride thereof and derivatives thereof (B-2), (C) 0.01 to 10 parts by weight of an alkylene glycol polymer having a primary or secondary amine group(s) with a number average molecular weight of 400 to 500,000, and (D) 0.1 to 20 parts by weight of an inorganic filler, and melting and kneading them.

In other words, the present invention provides a composition comprising the above-described components, (A), (B), (C) and (D).

DETAILED DESCRIPTION OF THE INVENTION

Components of the present invention will be described below.

The polyacetal resin (A) used in the present invention is a polymer having, as the main constitution, an oxymethylene group ($—CH_2O—$). It may be any of a polyoxymethylene homopolymer or a copolymer, terpolymer or block polymer having, as the main repeating unit, an oxymethylene group and containing, other than such a unit, a small quantity of other unit(s), for example, a unit derived from a comonomer such as ethylene oxide, 1,3-dioxolane, 1,4-butanediol; or may be not only a linear one but also one having a branched or cross-linked structure in the molecule; or may be a known modified polyoxymethylene having other organic group(s) introduced. Also, the polymerization degree is not particularly limited, and it may be one having a melt-moldability. Preferable polyacetal resin is one having a melt index (measured according to ASTM D-1238-89E, hereinafter abbreviated as MI) of 1 to 50 g/10 min., still more preferably one having a MI of 7 to 30 g/10 min.

Next, component (B) blended with the polyacetal resin in the present invention is a modified olefinic polymer obtained by modifying an olefinic polymer (B-1) with at least one member selected from the group consisting of an unsaturated carboxylic acid, and an acid anhydride and derivatives thereof (B-2). The olefinic polymer (B-1) to be used herein includes a homopolymer of an α-olefin such as ethylene, propylene, 1-butene, 1-hexene, 1-heptene, 1-octene, 1-nonene, 1-decene and 1-dodecene; a copolymer consisting of two or more of these a-olefins; and a random-, block- or graft-copolymer containing these a-olefins and at least one of the comonomer components selected from among α,β-unsaturated acids such as acrylic acid and methacrylic acid, α,β-unsaturated carboxylic acid esters such as methyl acrylate, ethyl acrylate, propyl acrylate, butyl acrylate, 2-ethylhexyl acrylate, hydroxyethyl acrylate, methyl methacrylate, ethyl methacrylate, propyl methacrylate, butyl methacrylate, 2-ethylhexyl methacrylate and hydroxyethyl methacrylate, non-conjugated dienes such as 1,4-hexadiene, dicyclopentadiene, 5-ethylidene-2-norbornene and 2,5-norbornadiene, conjugated dienes such as butadiene, isoprene and piperylene, aromatic vinyl compounds such as α-methylstyrene, vinyl ethers such as vinylmethyl ether and derivatives of these vinyl compounds. The polymerization degree, the presence or absence, or the degree of side chains or branches, the composition ratio of the copolymer and the like have no limitation.

More concrete examples of the olefinic polymer (B-1) in the present invention include polyethylene produced by high-pressure method, polyethylene produced by low or medium pressure method, ethylene-α-olefin copolymers produced by gas-phase method, LLDPE, polypropylene, polybutene, ethylene-propylene copolymer, ethylene-methyl acrylate copolymer, ethylene-ethyl acrylate copolymer, ethylene-butyl acrylate copolymer, ethylene-methyl methacrylate copolymer, ethylene-ethyl methacrylate copolymer and ethylene-propylene-diene terpolymer. Preferable are polyethylene, polypropylene, ethylene-propylene copolymer, ethylene-methyl acrylate copolymer, ethylene-ethyl acrylate copolymer, ethylene-methyl methacrylate copolymer and ethylene-ethyl methacrylate copolymer.

The modified olefinic polymer (B) usable in the present invention is one obtained by modifying the above-mentioned olefinic polymer (B-1) with at least one selected from the group consisting of unsaturated carboxylic acids, and acid anhydrides and derivatives thereof (B-2).

Component (B-2) used here includes unsaturated carboxylic acids such as acrylic acid, methacrylic acid, maleic acid, citraconic acid, itaconic acid, tetrahydrophthalic acid, nadic acid, methylnadic acid and allylsuccinic acid; unsaturated carboxylic acid anhydrides such as maleic anhydride, citraconic anhydride, itaconic anhydride, tetrahydrophthalic anhydride, nadic anhydride, methylnadic anhydride and allylsuccinic anhydride; derivatives thereof; and other.

As the modification method, for example, a method wherein the polyolefinic (co)polymer is reacted with at least one compound selected from the group consisting of an unsaturated carboxylic acid, and acid anhydrides and derivatives thereof in a solution or melted state in the presence of a radical initiator such as organic peroxides under heating is preferable. However, the method is not particularly limited thereto. The amount of both components to be blended is 0.1 to 20 parts by weight, preferably 0.1 to 10 parts by weight based on 100 parts by weight of the olefinic polymer. When the effective amount of the compound in the modified olefinic polymer is too small, the effects of the present invention can not be attained since the compatibility between the polyacetal resin (A) or component (C), and the modified olefinic polymer (B) is not sufficiently improved, while when the amount is too large, the properties to be improved, such as sliding performances, may be adversely affected in some cases.

Specific examples of preferable modified olefinic copolymer include polyethylene, polypropylene, ethylene-propylene copolymer, ethylene-ethylacrylate copolymer, ethylene-methylacrylate copolymer, ethylene-ethylmethacrylate copolymer and ethylene-methylmethacrylate copolymer, which are modified with maleic anhydride.

Further, by using a combination of the modified olefinic polymer mainly consisting of the α-olefin modified with maleic anhydride, and the modified polymer consisting of the α-olefin and α,β-unsaturated carboxylic acid ester modified with maleic anhydride, for example, a combination of polyethylene modified with maleic anhydride and/or polypropylene modified with maleic anhydride and ethylene-methylmethacrylate copolymer modified with maleic anhydride and/or ethylene-ethylacrylate copolymer modified with maleic anhydride, the composition of the present invention can exhibit excellent friction and abrasion resistance properties and be favorably used.

Preferable modified olefinic polymer is one having a MI of 0.01 to 100 g/10 min., still more preferably one having a MI of 0.1 to 50 g/10 min., and particularly preferably one having a MI of 0.2 to 30 g/10 min.

With respect to the blending ratio between the polyacetal resin (A) and the modified olefinic polymer (B) is 0.5 to 100 parts by weight, preferably 0.5 to 50 parts by weight, and particularly preferably 0.5 to 20 parts by weight, based on 100 parts by weight of the polyacetal resin (A). When the component (B) is insufficient, the physical properties to be improved, such as the sliding performances, are unsatisfactory. While, when it is excess, it unfavorably impairs the mechanical properties and deteriorates the appearance of the molded articles.

Next, the alkylene glycol polymer having a primary or secondary amino group(s) as component (C), is a polymer which is a homopolymer or copolymer of ethylene glycol, propylene glycol or tetramethylene glycol, and has a primary or secondary amino group(s) at a terminal(s) or in the middle of the molecular chain. Polymers with a slight modification, e.g., further forming an ester with an aliphatic acids, or forming an ester with an aliphatic alcohol can also be used. Examples thereof include polyethylene glycol, polypropylene glycol, polytetramethylene glycol and copolymers comprising the constitution units thereof which contain at least one aminopropyl group or aminooctyl group.

The number average molecular weight of the alkylene oxide polymer having a primary or secondary amine group (s) as component (C), is 400 to 500,000, preferably 400 to 100,000. This is because that, when the molecular weight of component (C) is below 400, it impairs the mechanical properties and sliding performances of the polyacetal resin or the resin of component (B) as a high-molecular material, and that when it exceeds 500,000, the melt viscosity becomes so high as to be difficult to disperse it in the polyacetal resin, although the dispersibility of component (B) in the polyacetal resin is improved by the incorporation of component (C).

The number average molecular weight of the alkylene glycol polymer having a primary or secondary amino group (s) as component (C), is 400 to 500,000, preferably 400 to 100,000. This is because that when the number average molecular weight of component (C) is below 400, it impairs the mechanical properties or the resin of component (B) as a high-molecular material, and that when it exceeds 500,000, the melt viscosity becomes so high as to be difficult to disperse it in the polyacetal resin, although the dispersibility of component (B) into the polyacetal resin is improved by incorporation of component (C).

The amount of the alkylene glycol polymer having a primary or secondary amino group(s) as component (C) to be blended is 0.01 to 10 parts by weight, preferably 0.1 to 5 parts by weight based on 100 parts by weight of component (A). When component (C) is insufficient, the improvement effects can be unsatisfactory obtained, while when it is excess, it unfavorably impairs the mechanical properties.

The inorganic filler used as component (D) in the present invention will be described below.

As the inorganic filler (D) in the present invention, a t least one member selected from among calcium carbonate, potassium titanate, barium carbonate, talc, wollastonite, mica and zinc oxide, and more preferably at least one member selected from among calcium carbonate, potassium titanate, barium carbonate and zinc oxide is(are) preferably used. The inorganic filler (D) is not affected by forms such as particle shape, fibrous form, aspect ratio, etc. Any of the inorganic filler cited above can be used.

The amount of the inorganic filler as component (D), is 0.1 to 20 parts by weight, preferably 0.3 to 15 parts by weight, and particularly preferably 0.5 to 10 parts by weight based on 100 parts by weight of component (A). When the amount of component (D) is insufficient, the improvement effects of the sliding performances against metal can be unsatisfactory obtained, while when it is excess, it unfavorably impairs the sliding performances against resins.

Although the composition of the present invention, containing a polyacetal resin (A), a modified olefinic polymer (B), an alkylene glycol polymer (C) having a primary or secondary amino group(s) and an inorganic filler (D), exhibits excellent properties, and extremely excellent effects in, particularly, sliding performances and molding processabilities, etc., as described above. Moreover, enhanced effects can be obtained by further using a lubricant (E) in addition to the above-mentioned components (A) to (D).

As the lubricant (E) in the present invention, at least one member selected from the group consisting of silicones, α-olefin oligomers, paraffin, substituted diphenyl ether, derivatives of fatty acids having 10 or more carbon atoms and derivatives of aliphatic alcohol having 10 or more carbon atoms can be preferably used. Among these lubricants, those having a particular viscosity, average molecular weight and/or substituents may be used more preferably although any specific lubricants can favorably be used.

Now, such lubricants will be explained in detail.

As silicones, polydimethylsiloxane and polymethylphenylsiloxane represented by the formula (1) are preferably used as representatives:

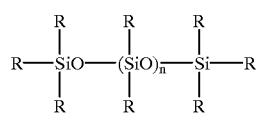

(1)

wherein R is a methyl group, a part of which may be, e.g., an alkyl group, a phenyl group, a halogenated alkyl group, a halogenated phenyl group and a polyalkylene glycol.

Further, modified poly(organosiloxane)s, which are prepared by substituting various substituents such as halogenated phenyl groups represented by chloro-phenyl group; alkyl groups having 8 or more carbon atoms; alkylene glycols represented by polyethylene glycol; higher aliphatic ester groups, as derivatives of aliphatic carboxylic acid having 8 or more carbon atoms; and halogenated alkyl groups represented by trifluoromethyl group, for a part of the methyl group in the dimethylsiloxane, can also be used.

As such silicone oils, those having a kinematic viscosity (25° C.) in the range of 100 to 100,000 cSt are preferably used in the present invention.

The α-olefinic oligomer is an aliphatic hydrocarbon which mainly contains a structure that an α-olefin having $C_6$ to $C_{20}$ is polymerized or ethylene is copolymerized with an α-olefin having $C_3$ to $C_{20}$. In the present invention, ethylene α-olefinic cooligomers having a number average molecular weight of 400 to 4,000 are preferably used.

The paraffin refers to the so-called paraffinic mineral oil which is mainly obtained by refining petroleum fraction. In the present invention, those having an average molecular weight of 300 to 800 are preferably used.

The substituted diphenyl ether refers to compounds prepared by introducing at least one saturated aliphatic chain having at least $C_{12}$ into phenyl group(s) of the diphenyl ether in the substituent form selected from among an alkyl group, an ester group and an ether group, as shown in the formula (2) below. There is no particular limitation for the molecular weight. Any of alkyl-substituted diphenyl ethers is preferably used.

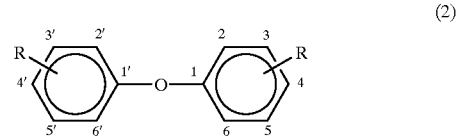

(2)

wherein R is an alkyl, ether or ester group(s) introduced into a part or all of 2 to 6-position and 2' to 6'-position.

As substituents of such alkyl-substituted diphenyl ethers, linear alkyl groups such as dodecyl, tetradecyl, hexadecyl or octadecyl group; branched alkyl groups represented by the formula (3); and the like are cited.

(3)

wherein n and m are each an integer of zero or more, with the proviso that $n+m \geq 11$.

While, as ester groups, dodesiloxy carbonyl, tetradesiloxy carbonyl, hexadesiloxy carbonyl, octadesiloxy carbonyl, lauroyloxy, myristoyloxy, palmitoyloxy, stearoyloxy group and others are cited. Further, as ether groups, lauroyl, myristoyl, palmitoyl, stearoyl group and others are cited. Furthermore, there may also be such a group that the aliphatic hydrocarbon chain in such the ester groups and ether groups has a branched structure, for example, one derived from isostearyl alcohol, isostearic acid or the like.

The effects of such substituted diphenyl ethers are not limited by the position of the substituent and any substituted diphenyl ether may be preferably used. From the standpoint of synthesis, however, preferable are substituted diphenyl ether s having a substituent(s) at a part or all of 2, 4, 6, 2', 4' and 6'-position, and particularly preferable is one having two substituents at 4 and 4'-positions.

The derivative of a fatty acid having 10 or more carbon atoms in the present invention is an ester of a fatty acid having at least 10 carbon atoms with a monohydric or polyhydric aliphatic and/or aromatic alcohol having at least 10 carbon atoms, or an amide of a fatty acid having at least 10 carbon atoms with a primary, secondary or tertiary amine.

As the derivative of an aliphatic alcohol having 10 or more car b on atoms is an ester of an aliphatic alcohol having at least 10 carbon atoms with a mono or polyvalent aliphatic and/or aromatic carboxylic acid having at least 10 carbon atoms.

The esters and amides will be explained in detail.

As the fatty acids having at least 10 carbon atoms constituting the esters, saturated fatty acids, unsaturated fatty acids, linear fatty acids and branched fatty acids, such as lauric acid, tridecanoic acid, myristic acid, palmitic acid, stearic acid, isostearic acid, oleic acid, linoleic acid, linolenic acid, arachic or arachidinic acid, behenic acid, lignoceric acid, cerotic acid, montanoic acid and melissic acid, further, derivatives of such fatty acids, e.g., 2-bromostearic acid, 18-bromostearic acid and 18-hydroxystearic acid, are cited. Any of them is preferably used.

As the alcohols constituting the esters together with such the fatty acids, monohydric saturated or unsaturated aliphatic alcohols, linear or branched alcohols and the like, such as n-octyl alcohol, 2-ethylhexyl alcohol, isononyl alcohol, n-decyl alcohol, isodecyl alcohol, lauryl alcohol, myristyl alcohol, cetyl alcohol, 14-methylhexadecane-1-ol, stearyl alcohol, oleyl alcohol, 16-methylhexadecanol, 18-methylnonadecanol, 18-methylicosanol, docosanol, 20-methylheneicosanol, 20-methyldocosanol, tetracosanol, hexacosanol and octacosanol, are cited. Any of them is preferably used.

Further, as the aromatic alcohols constituting the esters, phenol, catechol, naphthol, and the like are cited. Furthermore, as the aliphatic polyhydric alcohols, polyhydric alcohols such as ethylene glycol, propylene glycol, 1,4-butanediol, 1,5-pentanediol, 1,6-hexanediol, 1,2-octanediol, hexadecane-1,2-diol, octadecane-1,2-diol, icosane-1,2-diol, glycerol, trimethyrolpropane, erythritol, pentaerythritol, solbitol, 1,2-cyclononanediol and 1,2-cyclodecanediol; condensates of such the polyhydric alcohols, such as dipentaerythritol, tripentaerythritol, diethylene glycol, diglycerol, triglycerol, polyglycerol, polyethylene glycol and polypropylene glycol; partial esters of such the polyhydric alcohols with polybasic acids such as succinic acid and adipic acid; and others are cited. Any of them is preferably used.

As the primary, secondary or tertiary amine, ammonia, ethylenediamine, tetramethylenediamine, monoethanolamine and others are cited.

As the aliphatic alcohols having at least 10 carbon atoms, saturated or unsaturated aliphatic alcohols, linear or branched alcohols and others, such as lauryl alcohol, myristyl alcohol, cetyl alcohol, 14-methylhexadecane-1-ol, stearyl alcohol, oleyl alcohol, 16-methylhexadecanol, 18-methylnonadecanol, 18-methylicosanol, docosanol, 20-methylheneicosanol, 20-methyldocosanol, tetracosanol, hexacosanol and octacosanol, are cited. Any of them is preferably used.

As the fatty acids constituting the esters with such the alcohols, the above-mentioned fatty acids and saturated fatty acids, unsaturated fatty acids, linear fatty acids and branched fatty acids, such as lauric acid, tridecanoic acid, myristic acid, palmitic acid, stearic acid, isostearic acid, oleic acid, linoleic acid, linolenic acid, arachic acid, behenic acid, lignoceric acid, cerotic acid, montanoic acid and melissic acid, and further, derivatives of such the fatty acids such as 2-bromostearic acid, 18-bromostearic acid and 12-hydroxystearic acid, are cited. Any of them is preferably used.

While, as the aromatic carboxylic acids, benzoic acid, phthalic acid and the like are cited. As the aliphatic polybasic acids, oxalic acid, malonic acid, succinic acid, glutaric acid, adipic acid, pimelic acid, suberic acid, azelaic acid, sebacic acid, 1,12-dodecamethylene dicarboxylic acid, 1,14-tetradecamethylene dicarboxylic acid, 1,16-hexadecamethylene dicarboxylic acid, 1,18-octadecamethylene dicarboxylic acid, trimellitic acid, maleic acid, fumaric acid, derivatives thereof and others are cited. Any of them is preferably used.

Although any of the esters composed of the above-described carboxylic acids and alcohols are preferably used, the following esters and amides are still more preferably used because of easier availability. That is, esters such as lauryl laurate, lauryl stearate, cetyl palmitate, isotridecyl stearate, oleyl oleate, stearyl stearate, isostearyl stearate, isostearyl isostearate, behenyl behenate, ethylene glycol distearate, glycerol monostearate, glycerol monobehenate, glycerol di and tristearate, trimethylolpropane triisostearate, pentaerythritol tetraisostearate, pentaerythritol tetrastearate, polyethylene glycol dilaurate, polyethylene glycol distearate, diisotridecyl adipate and diisotridecyl phthalate; and amides such as palmitamide, stearamide, ethylenebisstearamide and tetramethylenebisstearamide are cited, and at least one member among such esters and amides is(are) preferably used.

In the present invention, the amount of such the lubricant (E) added is 0.1 to 20 parts by weight, preferably 0.5 to 5 parts by weight based on 100 parts by weight of the sum total of components (A), (B), (C) and (D). When it is less than 0.1 part by weight, the original effects of the lubricant are difficultly exhibited. While when the amount is more than 20 parts by weight, on the contrary, the properties of the polyacetal, as the base, are unfavorably impaired.

By adding, further, various types of known stabilizers, the stability of the composition of the present invention can be reinforced. Furthermore, various types of known additives can also blended therewith for improving the physical properties depending on the used desired.

Examples of the additives include various kinds of colorants, mold releasing agents (other than the above-described lubricants), nuclear agents, antistatics, other surfactants and different type polymers (other than the graft copolymers described above).

An inorganic, organic or metallic filler(s) in the form of fiber, granule or plate may be used singly or a mixture of two of them as long as it does not significantly deteriorate the desired performances of the composition of the present invention.

Next, the composition of the present invention can be easily prepared by a known method generally used as a conventional preparation method resin compositions. Any of methods, for example, a method wherein respective components are mixed one another at first, and then kneaded and extruded by a single-screw or twin-screw extruder to prepare pellets; and a method wherein pellets (master batches) having different compositions are prepared at first, and then predetermined amounts of pellets are mixed (diluted) one another can be employed.

Further, in the preparation of such the composition, it is a preferable method for improving the dispersibility of the additive(s) that a part or all of the respective is pulverized and mixed with other components, and then extrusion and other(s) are carried out.

Furthermore, when the lubricant (E), especially of liquid type, is used, the method wherein the lubricant is preliminarily mixed with respective components to be impregnated thereto, and then it is kneaded and extruded is also a preferable one in view of the easier preparation of the composition and the improvements of the processability and sliding performances.

The sliding members, obtained by processing such the composition in a method of molding and/or extrusion, etc., have excellent friction and abrasion resistance properties and excellent sliding performances against resins as well as excellent sliding performances against metals. Therefore, they can be favorably used for various sliding parts in AV and OA fields.

EXAMPLES

The present invention is now explained more concretely with reference to examples, but the present invention is not limited by these examples. Examples 1 to 23 and Comparative Examples 1 to 14

A polyacetal resin (A) was mixed with a modified olefinic polymer (B), an alkylene glycol polymer (C) having a primary or secondary amino group(s) and an inorganic filler (D), together with various lubricants (E) in some examples, in a ratio as shown in Tables 1 and 2. They were melted and kneaded using a twin screw extruder at a set temperature of 190° C. with a screw revolution of 80 rpm to prepare pellets. Subsequently, test pieces were prepared by molding the pellets with an injection molder, and then, the evaluations on the test pieces were carried out. The results are shown in Tables 1 and 2.

The evaluation methods for various physical properties in the Examples are as follows:

Test for Friction and Abrasion

<Slide against GF-ABS>

Using Suzuki's Friction and Abrasion Tester, a slide was carried out against GF-ABS ("Cevian"; trade name, manufactured by Daicel Chemical Industries, Ltd.) to determine the dynamic friction coefficient and specific abrasiveness.

Slide condition:

Test machine:

Suzuki's Friction and Abrasion Tester (manufactured by Orientech, Ltd.)

Surface pressure: 0.06 MPa,

Linear velocity: 15 cm/sec., and 24-hour slide.

<Slide against steel>

A slide was carried out against steel (S55C) using the Suzuki's testing machine to determine the dynamic friction coefficient and specific abrasiveness.

Slide condition:

Test machine:

Suzuki's Friction and Abrasion Tester (manufactured by Orientech, Ltd.)

Surface pressure: 0.98 MPa,

Linear velocity: 15 cm/sec., and 24-hour slide.

TABLE 1

| | Polyacetal resin (A) | | Modified olefinic polymer (B) | | Alkylene glycol polymer amino group-containing | | | Inorganic filler (D) | | Lubricant (E) | | against GF-ABS | | | against steel | |
|---|---|---|---|---|---|---|---|---|---|---|---|---|---|---|---|---|
| | | | | | | | | | | | | | Specific abrasion | | | Specific abrasion |
| Ex. | part by wt. | type | part by wt. | type | part by wt. | wt. %* | type | part by wt. | type | part by wt. | Friction coefficient | Own material | Partner material | Friction coefficient | Own material |
| 1 | A-1 | 100 | B-1 | 2 | C-1 | 0.5 | 25 | D-1 | 1 | | | 0.22 | 10.1 | 8.0 | 0.26 | 0.65 |
| 2 | A-1 | 100 | B-1 | 5 | C-1 | 0.5 | 10 | D-2 | 1 | | | 0.21 | 9.2 | 7.6 | 0.24 | 0.52 |
| 3 | A-1 | 100 | B-1 | 10 | C-1 | 0.5 | 5 | D-3 | 1 | | | 0.21 | 5.4 | 5.1 | 0.21 | 0.44 |
| 4 | A-1 | 100 | B-2 | 5 | C-1 | 0.5 | 10 | D-1 | 1 | | | 0.21 | 9.3 | 7.6 | 0.23 | 0.52 |
| 5 | A-1 | 100 | B-2 | 5 | C-1 | 0.5 | 10 | D-2 | 1 | | | 0.21 | 9.4 | 7.4 | 0.22 | 0.54 |
| 6 | A-1 | 100 | B-3 | 5 | C-1 | 0.5 | 10 | D-1 | 1 | | | 0.23 | 10.2 | 9.5 | 0.25 | 0.62 |
| 7 | A-1 | 100 | B-3 | 5 | C-1 | 0.5 | 10 | D-2 | 1 | | | 0.24 | 10.3 | 9.6 | 0.25 | 0.63 |
| 8 | A-1 | 100 | B-1 | 5 | C-2 | 0.5 | 10 | D-1 | 1 | | | 0.21 | 8.8 | 7.6 | 0.22 | 0.54 |
| 9 | A-1 | 100 | B-1 | 5 | C-1 | 0.5 | 10 | D-3 | 1 | | | 0.21 | 8.9 | 7.8 | 0.23 | 0.55 |
| 10 | A-1 | 100 | B-1 | 5 | C-1 | 0.5 | 10 | D-4 | 1 | | | 0.18 | 5.5 | 6.3 | 0.23 | 0.54 |
| 11 | A-1 | 100 | B-1 | 4 | C-1 | 0.5 | 10 | D-1 | 1 | | | 0.17 | 5.4 | 6.2 | 0.21 | 0.48 |
| | | | B-4 | 1 | | | | | 1 | | | | | | | |
| 12 | A-1 | 100 | B-1 | 3 | C-1 | 0.5 | 10 | D-1 | 1 | | | 0.17 | 5.6 | 6.4 | 0.22 | 0.49 |
| | | | B-4 | 2 | | | | | 1 | | | | | | | |
| 13 | A-1 | 100 | B-1 | 5 | C-1 | 0.5 | 10 | D-1 | 1 | E-1 | 0.5 | 0.16 | 3.0 | 3.6 | 0.20 | 0.40 |
| 14 | A-1 | 100 | B-1 | 5 | C-1 | 0.5 | 10 | D-1 | 1 | E-1 | 1 | 0.14 | 2.6 | 3.2 | 0.22 | 0.47 |
| 15 | A-1 | 100 | B-1 | 5 | C-1 | 0.5 | 10 | D-1 | 1 | E-1 | 2 | 0.12 | 2.2 | 3.1 | 0.25 | 0.48 |
| 16 | A-1 | 100 | B-1 | 5 | C-1 | 0.5 | 10 | D-1 | 1 | E-2 | 2 | 0.12 | 2.3 | 3.1 | 0.24 | 0.49 |
| 17 | A-1 | 100 | B-1 | 5 | C-1 | 0.5 | 10 | D-1 | 1 | E-3 | 2 | 0.17 | 3.6 | 5.3 | 0.19 | 0.31 |
| 18 | A-1 | 100 | B-1 | 5 | C-1 | 0.5 | 10 | D-1 | 1 | E-4 | 2 | 0.16 | 3.6 | 5.3 | 0.20 | 0.32 |
| 19 | A-1 | 100 | B-1 | 5 | C-1 | 0.5 | 10 | D-1 | 1 | E-5 | 2 | 0.18 | 4.6 | 6.5 | 0.20 | 0.33 |
| 20 | A-1 | 100 | B-1 | 5 | C-1 | 0.5 | 10 | D-1 | 1 | E-6 | 2 | 0.18 | 3.4 | 5.4 | 0.16 | 0.22 |
| 21 | A-1 | 100 | B-1 | 5 | C-1 | 0.5 | 10 | D-1 | 1 | E-7 | 2 | 0.18 | 3.5 | 5.5 | 0.13 | 0.22 |
| 22 | A-1 | 100 | B-1 | 5 | C-1 | 0.5 | 10 | D-1 | 1 | E-8 | 2 | 0.21 | 3.8 | 6.0 | 0.12 | 0.20 |
| 23 | A-1 | 100 | B-1 | 5 | C-1 | 0.5 | 10 | D-1 | 1 | E-8 | 1 | 0.16 | 3.4 | 6.0 | 0.14 | 0.30 |
| | | | | | | | | | | E-4 | 1 | | | | | |

*Ratio to component (B)

TABLE 2

| | Polyacetal resin (A) | | Modified olefinic polymer (B) | | Alkylene glycol polymer amino group-containing | | | Inorganic filler (D) | | Lubricant (E) | | against GF-ABS | | | against steel | |
|---|---|---|---|---|---|---|---|---|---|---|---|---|---|---|---|---|
| | | | | | | | | | | | | | Specific abrasion | | | Specific abrasion |
| Com. Ex. | part by wt. | type | part by wt. | type | part by. wt. | wt. % | type | part by wt. | type | part by wt. | Friction coefficient | Own material | Partner material | Friction coefficient | Own material |
| 1 | A-1 | 100 | B-1 | 2 | C-1 | 0.5 | 25 | | | | | 0.25 | 15.2 | 14.3 | 0.32 | 1.34 |
| 2 | A-1 | 100 | B-1 | 5 | C-1 | 0.5 | 10 | | | | | 0.24 | 13.2 | 11.9 | 0.30 | 1.28 |
| 3 | A-1 | 100 | B-1 | 10 | C-1 | 0.5 | 5 | | | | | 0.24 | 9.5 | 9.9 | 0.29 | 1.24 |
| 4 | A-1 | 100 | B-2 | 5 | C-1 | 0.5 | 10 | | | | | 0.24 | 14.4 | 12.9 | 0.30 | 1.29 |

TABLE 2-continued

| Com. Ex. | Polyacetal resin (A) part by wt. | type | Modified olefinic polymer (B) part by wt. | type | Alkylene glycol polymer amino group-containing part by wt. | type | wt. %* | Inorganic filler (D) type | part by wt. | Lubricant (E) type | part by wt. | against GF-ABS Friction coefficient | Own material | Partner material | against steel Specific abrasion Friction coefficient | Own material |
|---|---|---|---|---|---|---|---|---|---|---|---|---|---|---|---|---|
| 5 | 100 | A-1 | 5 | B-3 | 0.5 | C-1 | 10 | | | | | 0.26 | 15.5 | 14.3 | 0.31 | 1.15 |
| 6 | 100 | A-1 | 5 | B-1 | 0.5 | C-1 | 10 | | | | | 0.24 | 16.6 | 17.2 | 0.29 | 1.28 |
| 7 | 100 | A-1 | 5 | B-1 | 0.5 | C-1 | 10 | | | E-1 | 2 | 0.16 | 6.8 | 8.4 | 0.36 | 1.36 |
| 8 | 100 | A-1 | 5 | B-1 | 0.5 | C-2 | 10 | | | E-2 | 2 | 0.16 | 7.5 | 8.1 | 0.35 | 1.38 |
| 9 | 100 | A-1 | 5 | B-1 | 0.5 | C-1 | 10 | | | E-3 | 2 | 0.21 | 8.8 | 9.5 | 0.27 | 1.01 |
| 10 | 100 | A-1 | 5 | B-1 | 0.5 | C-1 | 10 | | | E-4 | 2 | 0.20 | 8.4 | 10.3 | 0.26 | 1.02 |
| 11 | 100 | A-1 | 5 | B-1 | 0.5 | C-1 | 10 | | | E-5 | 2 | 0.22 | 9.8 | 11.2 | 0.27 | 1.01 |
| 12 | 100 | A-1 | 5 | B-1 | 0.5 | C-1 | 10 | | | E-6 | 2 | 0.22 | 8.6 | 10.1 | 0.25 | 0.92 |
| 13 | 100 | A-1 | 5 | B-1 | 0.5 | C-1 | 10 | | | E-7 | 2 | 0.22 | 9.1 | 10.8 | 0.24 | 0.91 |
| 14 | 100 | A-1 | 5 | B-1 | 0.5 | C-1 | 10 | | | E-8 | 2 | 0.25 | 9.2 | 12.2 | 0.24 | 0.89 |

*Ratio to component (B)

A-1: Polyoxymethylene copolymer (MI=27 g/10 min.)
B-1: 2% maleic anhydride-modified polyethylene
B-2: 1% maleic anhydride-modified polyethylene
B-3: 1% maleic anhydride-modified polypropylene
B-4: 1% maleic anhydride-modified ethylene-ethylacrylate copolymer
C-1: Polyethyleneglycol di(aminopropyl)ether (Mw=4,000)
C-2: Polyethyleneglycol di(aminopropyl)ether (Mw=10,000)
D-1: Calcium carbonate (heavy calcium carbonate, average particle size of 4.3 μm)
D-2: Calcium carbonate (colloidal calcium carbonate, average particle size of 0.2 μm)
D-3: Potassium titanate
D-4: Barium carbonate
E-1: Poly(dimethylsiloxane) (average molecular weight of 18,000, viscosity of 1,000 cSt)
E-2: Poly(dimethylsiloxane) (average molecular weight of 65,000, viscosity of 60,000 cSt)
E-3: α-olefinic oligomer (average molecular weight of 1,030, viscosity of 800 cSt)
E-4: α-olefinic oligomer (average molecular weight of 2,600, viscosity of 28,000 cSt)
E-5: Paraffin (average molecular weight of 750, viscosity of 1,000 cSt)
E-6: Alkyl-substituted diphenyl ether (average molecular weight of 338, viscosity of 200 cSt)
E-7: Isostearyl stearate (average molecular weight of 536, solid)
E-8: Stearyl stearate (average molecular weight of 536, solid)

What is claimed is:

1. A polyacetal resin composition comprising:

(A) 100 parts by weight of a polyacetal resin, (B) 0.5 to 100 parts by weight of a modified olefinic polymer obtained by modifying an olefinic polymer (B-1) with at least one member selected from the group consisting of unsaturated carboxylic acids and acid anhydrides thereof and derivatives thereof (B-2), (C) 0.01 to 10 parts by weight of an alkylene glycol polymer containing a primary or secondary amino group(s) and having a number-average molecular weight of 400 to 500,000, and (D) 0.1 to 20 parts by weight of an inorganic filler.

2. The composition according to claim 1, wherein the inorganic filler (D) is at least one member selected from among calcium carbonate, potassium titanate, barium carbonate and zinc oxide.

3. The composition according to claim 1, wherein the modified olefinic polymer (B) is one obtained by modifying 100 parts by weight of the olefinic polymer (B-1) with 0.1 to 20 parts by weight of maleic anhydride (B-2).

4. The composition according to claim 3, wherein the olefinic polymer (B-1) is an olefinic (co)polymer mainly comprising an α-olefin.

5. The composition according to claim 3, wherein the olefinic polymer (B-1) is an olefinic copolymer of an α-olefin and an α,β-unsaturated carboxylic ester compound.

6. The composition according to claim 5, wherein the α,β-unsaturated carboxylic ester compound is at least one member selected from the group consisting of methyl acrylate, ethyl acrylate, propyl acrylate, butyl acrylate, methyl methacrylate, ethyl methacrylate, propyl methacrylate and butyl methacrylate.

7. The composition according to claim 1, wherein the olefinic polymer (B-1) is at least one of olefinic (co) polymers selected from the group consisting of polyethylene, polypropylene and ethylene/propylene copolymers, and olefinic copolymers selected from the group consisting of ethylene/methyl acrylate copolymer, ethylene/ethyl acrylate copolymer, ethylene/methyl methacrylate copolymer and ethylene/ethyl methacrylate copolymer.

8. The composition according to claim 1, which is further compounded with (E) 0.1 to 20 parts by weight, based on 100 parts by weight of the total amount of the components (A), (B), (C) and (D), of a lubricant.

9. The composition according to claim 8, wherein the lubricant (E) is at least one member selected from the group consisting of silicones, α-olefin oligomers, paraffins, substituted diphenyl ethers, derivatives of fatty acids having at least 10 carbon atoms, and derivatives of aliphatic alcohols having at least 10 carbon atoms.

10. The composition according to claim 9, wherein the silicone is a polydimethylsiloxane or polymethylphenylsiloxane having a kinematic viscosity (25° C.) in the range of 100 to 1,000,000 cSt.

11. The composition according to claim 9, wherein the α-olefin oligomer is an α-olefin oligomer and/or ethylene/α-olefin cooligomer having an average molecular weight of 400 to 4,000.

12. The composition according to claim 9, wherein the paraffin is one having an average molecular weight of 300 to 800.

13. The composition according to claim 9, wherein the substituted diphenyl ether is a compound having at least one saturated aliphatic substituent selected from among an alkyl, an ester and an ether group(s) having at least 12 carbon atoms.

14. The composition according to claim 9, wherein the derivative of a fatty acid having at least 10 carbon atoms is an ester of a fatty acid having at least 10 carbon atoms and a monohydric or polyhydric aliphatic and/or an aromatic alcohol having at least 10 carbon atoms, or an amide of a fatty acid having at leapt 10 carbon atoms and a primary, secondary or tertiary amine.

15. The composition according to claim 9, wherein the derivative of an aliphatic alcohol having at least 10 carbon atoms is an ester of an aliphatic alcohol having at least 10 carbon atoms and a monobasic or polybasic phatic and/or aromatic carboxylic acid having at least 10 carbon atoms.

16. A sliding member made from a polyacetal resin position according to claim 1.

* * * * *